US012633591B2

(12) United States Patent
Choi et al.

(10) Patent No.: US 12,633,591 B2
(45) Date of Patent: \*May 19, 2026

(54) BATTERY MODULE AND BATTERY PACK INCLUDING THE SAME

(71) Applicant: LG Energy Solution, Ltd., Seoul (KR)

(72) Inventors: Jonghwa Choi, Daejeon (KR);
Junyeob Seong, Daejeon (KR);
Myungki Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 442 days.

This patent is subject to a terminal disclaimer.

(21) Appl. No.: 17/603,490

(22) PCT Filed: Jun. 22, 2020

(86) PCT No.: PCT/KR2020/008073
§ 371 (c)(1),
(2) Date: Oct. 13, 2021

(87) PCT Pub. No.: WO2021/071053
PCT Pub. Date: Apr. 15, 2021

(65) Prior Publication Data
US 2022/0216537 A1 Jul. 7, 2022

(30) Foreign Application Priority Data
Oct. 10, 2019 (KR) ........................ 10-2019-0125308

(51) Int. Cl.
H01M 10/6551 (2014.01)
H01M 10/48 (2006.01)
(Continued)

(52) U.S. Cl.
CPC ....... H01M 10/6551 (2015.04); H01M 10/48 (2013.01); H01M 10/613 (2015.04);
(Continued)

(58) Field of Classification Search
CPC ........... H01M 10/6551; H01M 10/613; H01M 10/653; H01M 10/6556; H01M 50/505; H01M 10/48
See application file for complete search history.

(56) References Cited

U.S. PATENT DOCUMENTS

2009/0305116 A1* 12/2009 Yang ................... H01M 50/244
429/61
2010/0248008 A1 9/2010 Sugawara et al.
(Continued)

FOREIGN PATENT DOCUMENTS

CN 103247766 A 8/2013
CN 105098111 A 11/2015
(Continued)

OTHER PUBLICATIONS

International Search Report for Application No. PCT/KR2020/008067 mailed Sep. 28, 2020, 2 Pages.
(Continued)

*Primary Examiner* — Nicole M. Buie-Hatcher
*Assistant Examiner* — Taylor Harrison Krone
(74) *Attorney, Agent, or Firm* — Lerner David LLP

(57) ABSTRACT

A battery module includes: a battery cell stack in which a plurality of battery cells are stacked; an insulation plate covering a front surface or a rear surface of the battery cell stack; a busbar frame formed between the battery cell stack and the insulation plate; a sensing member connected to the busbar frame on an upper side of the battery cell stack; and side surface plates covering respective side surfaces of the battery cell stack, wherein each of the side surface plates includes a mounting part formed on an outer surface thereof, wherein a lower surface of the battery cell stack is opened, outermost battery cells of the plurality of battery cells and the side surface plates are coupled to each other, respectively, and the insulation plate is coupled with the busbar (Continued)

frame or at least one of the side surface plates to fix the plurality of battery cells.

17 Claims, 6 Drawing Sheets

(51) Int. Cl.

| | | |
|---|---|---|
| *H01M 10/613* | (2014.01) | |
| *H01M 10/653* | (2014.01) | |
| *H01M 10/6556* | (2014.01) | |
| *H01M 50/505* | (2021.01) | |

(52) U.S. Cl.
CPC ..... *H01M 10/653* (2015.04); *H01M 10/6556* (2015.04); *H01M 50/505* (2021.01)

(56) References Cited

U.S. PATENT DOCUMENTS

| | | | |
|---|---|---|---|
| 2011/0033736 A1 | 2/2011 | Meintschel et al. | |
| 2011/0052961 A1 | 3/2011 | Lamm et al. | |
| 2011/0070474 A1 | 3/2011 | Lee et al. | |
| 2012/0301769 A1 | 11/2012 | Okada et al. | |
| 2013/0004822 A1 | 1/2013 | Hashimoto et al. | |
| 2013/0157103 A1 | 6/2013 | Osakabe et al. | |
| 2013/0183571 A1 | 7/2013 | Miyazaki et al. | |
| 2013/0202926 A1 | 8/2013 | Yoon | |
| 2014/0045027 A1 | 2/2014 | Suzuki | |
| 2014/0113171 A1 | 4/2014 | Schaefer | |
| 2015/0064541 A1 | 3/2015 | Noh et al. | |
| 2015/0136438 A1 | 5/2015 | Lumetta | |
| 2015/0303425 A1 | 10/2015 | Kong | |
| 2015/0333305 A1 | 11/2015 | Seki et al. | |
| 2016/0072116 A1* | 3/2016 | Yanagihara | H01M 50/55 439/627 |
| 2016/0093931 A1* | 3/2016 | Rawlinson | H01M 50/209 429/72 |
| 2016/0172727 A1* | 6/2016 | Chan | H01M 10/613 429/120 |
| 2016/0301043 A1 | 10/2016 | Morisaku et al. | |
| 2017/0084886 A1 | 3/2017 | Tononishi | |
| 2017/0125756 A1 | 5/2017 | Nietling et al. | |
| 2017/0256830 A1* | 9/2017 | Qiu | H01M 10/625 |
| 2018/0048033 A1* | 2/2018 | Lee | H01M 50/50 |
| 2018/0108881 A1* | 4/2018 | Jin | H01M 50/242 |
| 2018/0114957 A1* | 4/2018 | Kim | H01M 10/6555 |
| 2018/0138565 A1* | 5/2018 | Lee | H01M 10/6554 |
| 2018/0342775 A1 | 11/2018 | Sei et al. | |
| 2018/0358668 A1* | 12/2018 | Doege | H01M 50/24 |
| 2019/0001838 A1 | 1/2019 | Choi et al. | |
| 2019/0074562 A1 | 3/2019 | Kim et al. | |
| 2019/0198952 A1* | 6/2019 | Choi | H01M 10/655 |
| 2019/0348720 A1 | 11/2019 | Oh et al. | |
| 2019/0389318 A1 | 12/2019 | Lee et al. | |
| 2020/0014005 A1 | 1/2020 | Lee et al. | |
| 2020/0076025 A1 | 3/2020 | Jo et al. | |
| 2020/0112014 A1 | 4/2020 | Kim et al. | |
| 2020/0144580 A1 | 5/2020 | Hong et al. | |
| 2020/0194851 A1 | 6/2020 | Seo et al. | |
| 2020/0259155 A1* | 8/2020 | Lee | H01M 10/486 |
| 2020/0411926 A1 | 12/2020 | Zhang | |
| 2021/0036277 A1 | 2/2021 | Seo et al. | |
| 2021/0057708 A1* | 2/2021 | Castillo | B60L 50/66 |
| 2021/0242541 A1 | 8/2021 | Sasaki et al. | |

| | | | |
|---|---|---|---|
| 2022/0247004 A1 | 8/2022 | Yun | |
| 2022/0278387 A1* | 9/2022 | Takata | H01M 10/651 |
| 2023/0291022 A1 | 9/2023 | Han et al. | |

FOREIGN PATENT DOCUMENTS

| | | | |
|---|---|---|---|
| CN | 107534196 A | 1/2018 | |
| CN | 107615515 A | 1/2018 | |
| CN | 207818670 U | 9/2018 | |
| CN | 108666494 A | 10/2018 | |
| CN | 208478403 U | 2/2019 | |
| JP | 2005243268 A | 9/2005 | |
| JP | 2012212609 A | 11/2012 | |
| JP | 2013161792 A | 8/2013 | |
| JP | 2013229266 A | 11/2013 | |
| JP | 3195826 U | 2/2015 | |
| JP | 2015046379 A | 3/2015 | |
| JP | 5892148 B2 | 3/2016 | |
| JP | 2018073545 A | 5/2018 | |
| JP | 2018536967 A | 12/2018 | |
| KR | 20150024724 A | 3/2015 | |
| KR | 20150064257 A | 6/2015 | |
| KR | 101647825 B1 | 8/2016 | |
| KR | 20160149836 A | 12/2016 | |
| KR | 20170006171 A | 1/2017 | |
| KR | 20170036639 A | 4/2017 | |
| KR | 20170107798 A | 9/2017 | |
| KR | 20180038253 A | 4/2018 | |
| KR | 20180080813 A | 7/2018 | |
| KR | 20180099437 A | 9/2018 | |
| KR | 20190026237 A | 3/2019 | |
| KR | 20190027096 A | 3/2019 | |
| KR | 20190064887 A | 6/2019 | |
| KR | 20190071454 A | 6/2019 | |
| KR | 20190073933 A | 6/2019 | |
| KR | 20190092835 A | 8/2019 | |
| KR | 20190109020 A | 9/2019 | |
| KR | 20190110782 A | 10/2019 | |
| KR | 20190112583 * | 10/2019 | H01M 10/6552 |
| KR | 20190112583 A | 10/2019 | |
| WO | 2012043594 A1 | 4/2012 | |
| WO | 2017052296 A1 | 3/2017 | |
| WO | 2018159928 A1 | 9/2018 | |
| WO | 2019124876 A1 | 6/2019 | |
| WO | 2019172545 A1 | 9/2019 | |
| WO | 2019177275 A1 | 9/2019 | |
| WO | 2019182251 A1 | 9/2019 | |

OTHER PUBLICATIONS

International Search Report for PCT/KR2020/008073 dated Sep. 28, 2020. 3 pgs.
Extended Search Report for Application No. 20873430.1 dated May 13, 2022. 7 pgs.
Extended Search Report for Application No. 20873701.5 dated May 19, 2022. 8 pgs.
Search Report dated Dec. 5, 2022 from the Office Action for Chinese Application No. 202080030611.4 issued Dec. 9, 2022, pp. 1-3. [See p. 1, categorizing the cited references].
Search Report dated Feb. 1, 2023 from the Office Action for Chinese Application No. 202080031565.X issued Feb. 9, 2023, pp. 1-3. [See p. 1, categorizing the cited references].
Search Report dated Feb. 23, 2024 from the Office Action for Chinese Application No. 202080031565.X Issued Feb. 28, 2024, pp. 1-2.

* cited by examiner

FIG. 2          PRIOR ART

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/008073, filed Jun. 22, 2020, published in Korean, which claims the benefit of Korean Patent Application No. 10-2019-0125308 filed on Oct. 10, 2019 with the Korean Intellectual Property Office, the disclosures of which are incorporated herein by reference in their entireties.

TECHNICAL FIELD

The present disclosure relates to a battery module and a battery pack including the same, and more particularly, to a battery module having a simplified structure, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Such a battery module includes a battery cell stack in which a plurality of battery cells are stacked, a frame accommodating the battery cell stack, a busbar frame formed at each of both ends of the battery cell stack, an end plate formed outside the busbar frame and an insulating plate formed inside the end plate.

FIG. 1 is an exploded perspective view illustrating a module structure of a battery module according to the related art. FIG. 2 is a schematic cross-sectional view illustrating assembled components when the battery module according to the related art is assembled in a battery pack.

Referring to FIG. 1, the battery module according to the related art includes a battery cell 10 stack, a busbar frame 20 covering front and rear surfaces of the battery cell 10 stack, an upper plate 21 connecting the busbar frame 20 at an upper end of the battery cell 10 stack, a frame 30 accommodating the battery cell 10 stack, the busbar frame 20, and the upper plate 21, and formed of a metal, a thermally conductive resin layer 11 formed between the frame and a lower surface of the battery cell stack, an insulation cover 40 formed on the outer side of the busbar frame 20, and end plates 50 formed of a metal material on the outer side of the insulation cover 40.

In this case, the frame 30 covers the upper, lower, left, and right surfaces of the battery cell 10 stack and end plates 50 are formed so as to cover the front and rear surfaces of the battery cell 10 stack, and as a result, the battery module has a structure in which a metal frame surrounds six surfaces of the battery cell 10 stack, and the thermally conductive resin layer 11 is separately inserted between the lower surface of the battery cell 10 stack and the metal frame to cool the battery cell 10.

In this way, because the metal frame surrounds the six surfaces of the battery cell 10 stack and the thermally conductive resin layer 11 is separately inserted thereto, the weight of the battery module becomes relatively heavier. And as illustrated in FIG. 2, the thermally conductive resin layer 11 and the frame 30 are located between (i) a heat sink 32 formed in the battery pack and a thermally conductive layer 31 formed on an upper side of the heat sink 32 and (ii) the battery cell 10 stack, so that a cooling path becomes complicated and cooling performance decreases.

DETAILED DESCRIPTION OF THE INVENTION

Technical Problem

It is an object of the present disclosure to provide a battery module having a structure capable of reducing a weight and reducing costs, and a battery pack including the same.

It is another object of the present disclosure to provide a battery module having a structure capable of improving a cooling performance, and a battery pack including the same.

Technical problems to be solved by the present disclosure are not limited to the above-mentioned technical problems, and other technical problems, which are not mentioned above, may be clearly understood from the following descriptions by those skilled in the art to which the present disclosure pertains.

Technical Solution

In order to realize the above object, according to one embodiment of the present disclosure, there is provided battery module and a battery pack including the same include: a battery cell stack in which a plurality of battery cells are stacked; an insulation plate covering a front surface or a rear surface of the battery cell stack; a busbar frame formed between the battery cell stack and the insulation plate; a sensing member connected to the busbar frame on an upper side of the battery cell stack; and side surface plates covering respective side surface of the battery cell stack, wherein each of the side surface plates includes a mounting part formed on an outer surface thereof, wherein a lower surface of the battery cell stack is opened, and wherein outermost battery cells of the plurality of battery cells and the side surface plates are coupled to each other, respectively, and the insulation plate is coupled with the busbar frame or at least one of the side surface plates to fix the plurality of battery cells forming the battery cell stack. Further, a thermally conductive layer contacting the lower surface of the battery cell stack and a heat sink located on a lower side of the thermally conductive layer are included.

The battery module may further include an upper plate located on the upper side of the sensing member to cover an upper surface of the battery cell stack and the sensing member.

The upper plate may be formed of a plastic.

The upper plate may be formed of a film.

Each of the side surface plates may be formed of a metal.

The insulation plate may be formed of a plastic.

The battery cell stack and the side surface plates may be coupled to each other by an adhesive agent.

The battery module may further include a lower cover covering the lower surface of the battery cell stack and the lower cover may be formed of a film.

In at least one of the side surface plates, the mounting part is formed of first, second, and third mounting parts, each of the first, second, and third mounting parts includes a coupling hole formed by passing through upwards and downwards, and the battery cell stack may be mounted through the coupling holes.

Advantageous Effects

A battery module and a battery pack comprising the same according to an embodiment of the present disclosure provide effects capable of reducing a weight of the battery module and saving a process cost incurred in a process of manufacturing the battery module, by forming a simple structure fixing a plurality of battery cells by using an insulation plate and a side surface plate instead of an existing frame.

Further, according to an embodiment of the present disclosure, a battery module and a battery pack including the same are formed such that the plurality of battery cells and a thermally conductive layer formed in the battery pack contact each other whereby a cooling path is simplified to improve the cooling performance.

The effects of the present disclosure are not limited to the above-mentioned effects, and other effects not mentioned will be clearly understood by those skilled in the art from the description of the claims.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, components or combinations thereof, but it should be understood that they do not preclude a possibility of existence or addition of one or more other features, numbers, steps, constitutional elements, components or combinations thereof.

Hereinafter, a battery module according to one embodiment of the present disclosure will be described with reference to FIGS. 3 and 4.

Figure 3:
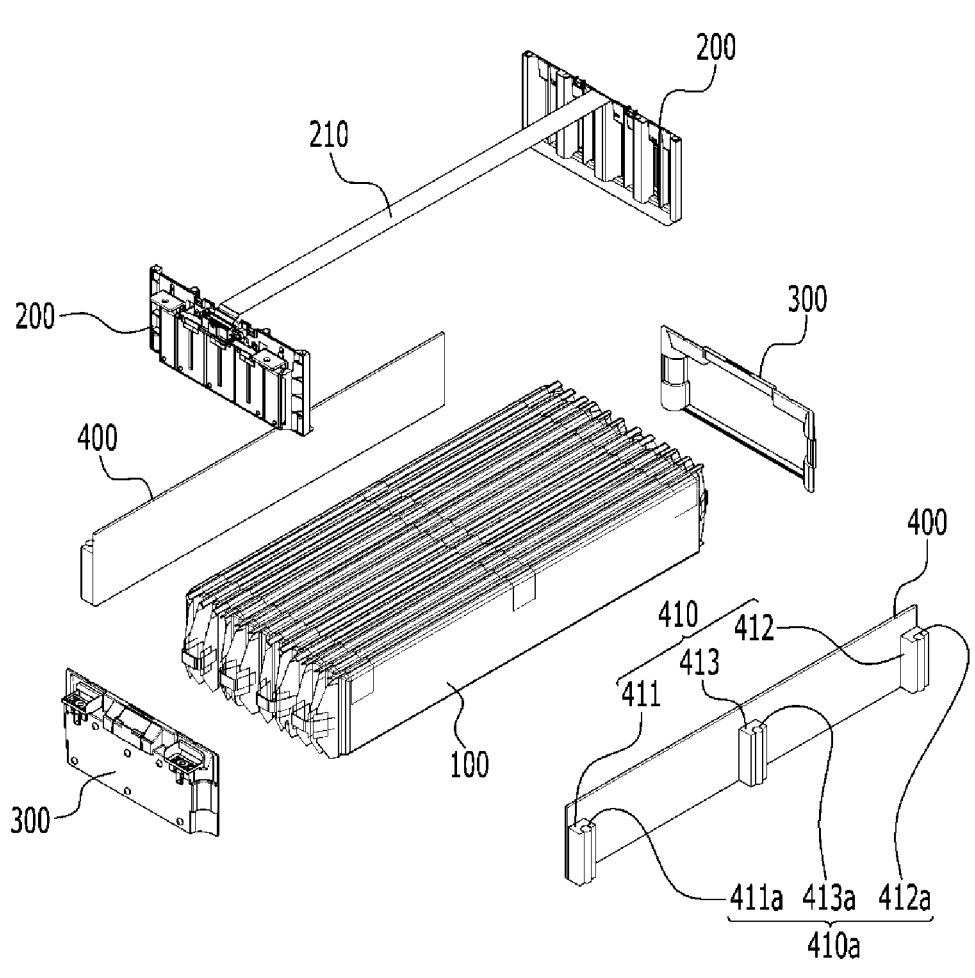
FIG. 3 is an exploded perspective view illustrating a battery module according to an embodiment of the present disclosure.

FIG. 3 is an exploded perspective view illustrating the battery module according to an embodiment of the present disclosure. FIG. 4 is a schematic cross-sectional view illustrating assembled components when the battery module according to an embodiment of the present disclosure is assembled in a battery pack.

Figure 4:
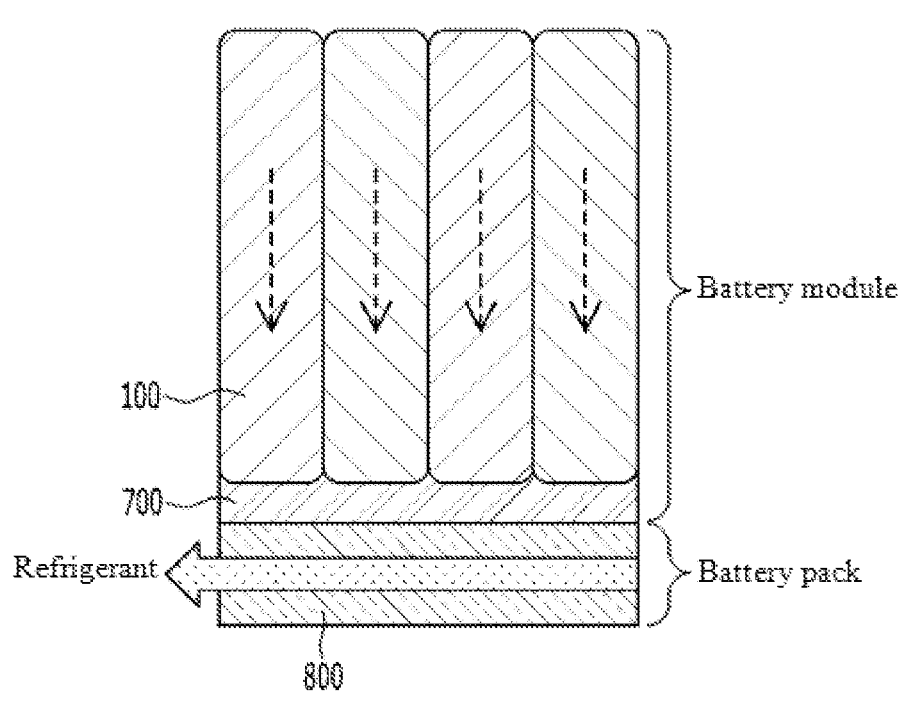
FIG. 4 is a schematic cross-sectional view illustrating assembled components when the battery module according to an embodiment of the present disclosure is assembled in a battery pack.

Referring to FIGS. 3 and 4, a battery module according to an embodiment of the present disclosure includes a battery cell stack in which a plurality of battery cells 100 are stacked, an insulation plate 300 covering front and rear surfaces of the battery cell stack, a busbar frame 200 formed between the battery cell stack and the insulation plate, a sensing member 210 connecting the busbar frame on the upper side of the battery cell stack, and side surface plates 400 covering both side surfaces of the battery cell stack, wherein a mounting part 410 is formed on an outer surface of the side surface plate, and the insulation plate 300 is coupled to the busbar frame 200 or the side surface plate 400 to fix the plurality of battery cells.

The battery cell 100 may be a secondary battery, and may be configured of a pouch type secondary battery. The battery cell 100 may be formed of a plurality of cells and the plurality of battery cells 100 may be mutually stacked so as to be electrically connected to each other, and thus the battery cell stack may be formed. Each of the plurality of battery cells may include an electrode assembly, a battery case, and an electrode lead (not illustrated) protruding from an electrode assembly.

Each of busbar frames 200 is formed on front and rear surfaces of the battery cell stack. The busbar frames 200 may be formed to cover the front and rear surface of the battery cell stack so as to electrically connect the electrode leads of a plurality of battery cells 100.

The sensing member 210 connects the busbar frame 200 formed on the front surface of the battery cell stack and the busbar frame 200 formed on the rear surface of the battery cell stack on the upper side of the battery cell stack. Each of the busbar frames 200 formed on the front and rear surfaces of the battery cell stack may be connected to each other through the sensing member 210.

Each of the insulation plates 300 is formed on the outer side of the busbar frames with respect to the battery cell stack so as to cover the front and rear surfaces of the battery cell stack. The insulation plates 300 are formed so as to cover the busbar frame 200 to interrupt the busbar frame 200 from being electrically connected to the outside. According to an embodiment of the present disclosure, the insulation plate 300 may be formed of plastic having an insulation function.

The side surface plates 400 are formed so as to cover both side surfaces of the battery cell stack. According to an embodiment of the present disclosure, the side surface plate 400 may be formed of a metal, and outermost battery cells formed on the opposite sides of the battery cell stack and the side surface plates 400 of the opposite sides thereof may be coupled to each other by an adhesive agent, respectively, and may be also pressed to be coupled to each other. However, the method for coupling the battery cell stack and the side surface plate is not limited thereto, but it is possible to couple the battery cell stack and the side surface plate in various ways.

The mounting part 410 may be formed on the outer surface of the side surface plate 400 to couple the battery module according to the embodiment of the present disclosure to the battery pack through the mounting part 410. The mounting part 410, as illustrated in FIG. 3, may include a first mounting part 411 formed at one side end of the side surface plate 400, a second mounting part 412 formed at opposite end of the side surface plate 400, and a third mounting part 413 formed at the center of the side surface plate.

Each of the mounting parts may include a coupling hole 410a formed to pass therethrough upwards and downwards. The first mounting part 411 may include a first coupling hole 411a, the second mounting part 412 may include a second coupling hole 412a, and a third mounting part 413 may include a third coupling hole 413a. The battery module according to the embodiment of the present disclosure may be coupled to the battery pack through the coupling hole 410a.

The insulation plate 300 is coupled to the busbar frame 200 or the side surface plate 400 to function to fix the plurality of battery cells 100 located in the interiors of plates. According to the embodiment of the present disclosure, the insulation plate 300 may be coupled to the busbar frame 200 or the side surface plate 400 through an adhesive agent.

In a battery module according to the related art, a frame covers the upper, lower, left, and right surfaces of a battery cell stack and end plates cover front and rear surfaces of the battery cell stack so that the weight of the battery module becomes relatively heavy, and it costs a lot to manufacture the frame and the end plates. However, the battery module according to the embodiment of the present disclosure may remove the conventional the frame and the end plates, and instead, may fix and protect the battery cell stack with only the insulation plate and the side surface plates, and thus the weight of the battery module may be reduced and costs for manufacturing the battery module may be reduced.

The battery module according to the embodiment of the present disclosure may be formed such that the lower surface of the battery cell 100 stack is opened. The fact that the lower surface of the battery cell 100 stack is opened means that the lower surface of the battery cell 100 stack is not covered by the frame or the plate as in the related art. Accordingly, when the battery module is installed in the battery pack, the lower surface of the battery cell stack may contact a thermally conductive layer 700 formed in the battery pack according to an embodiment of the present disclosure and may be connected to a heat sink 800 formed on the lower side of the thermally conductive layer 700 through the thermally conductive layer.

The thermally conductive layer 700 may be formed of a thermally conductive substance and the thermally conductive layer 700 may transfer heat generated from the plurality of battery cells 100 of the battery module to the outside of the battery module. The heat sink 800 contacts the thermally conductive layer 700 to emit heat transferred from the thermally conductive layer 700 to the to the outside through refrigerant flowing inside the heat sink 800.

Figure 1:
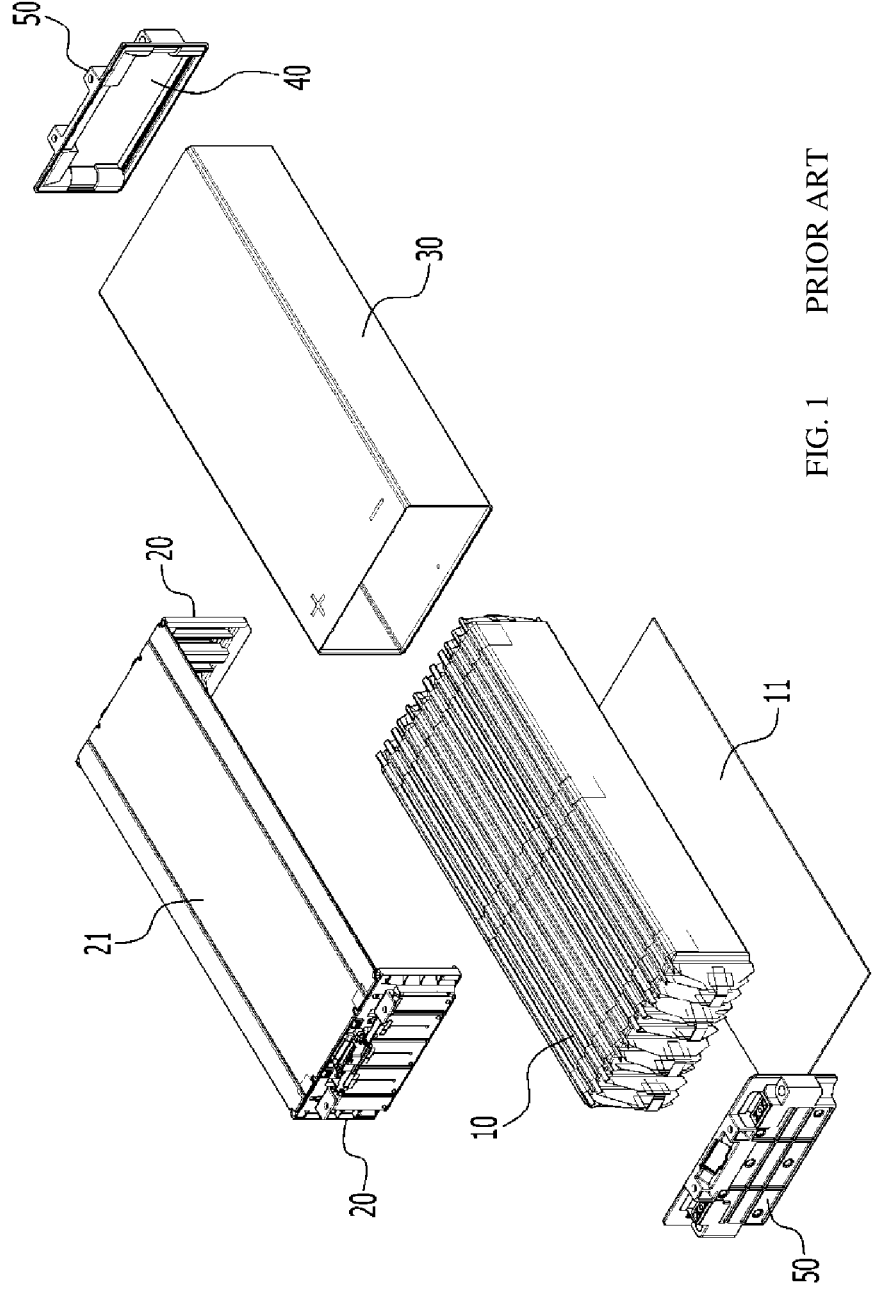
FIG. 1 is an exploded perspective view illustrating a module structure of a battery module according to the related art.
Figure 2:
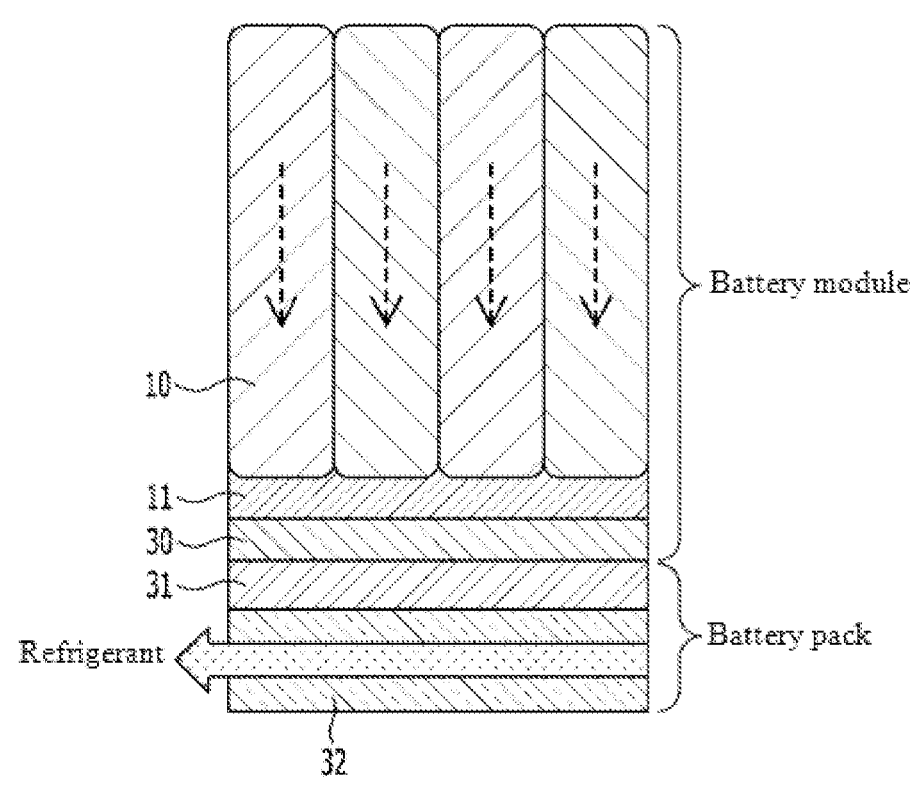
FIG. 2 is a schematic cross-sectional view illustrating assembled components when the battery module according to the related art is assembled in a battery pack.

According to the related art, as illustrated in FIG. 2. heat generated from the battery cell has to sequentially pass through a thermally conductive layer, a frame, and a thermally conductive layer, and a heat sink to be emitted to the outside. However, in the battery module according to the embodiment of the present disclosure, because the thermally conductive resin and the frame are removed and the battery cell 100 directly contacts the thermally conductive layer 700 of the battery cell, heat generated in the battery cell 100 passes through only the thermally conductive layer 700 and the heat sink 800, and thus a heat transfer path may be simplified to improve cooling performance. Further, because it is not necessary to use the thermally conductive resin, the weight of the battery module can be reduced and costs for manufacturing the battery module can be reduced.

Hereinafter, according to a modified embodiment of the present disclosure, a battery module having an upper plate will be described.

Figure 5:
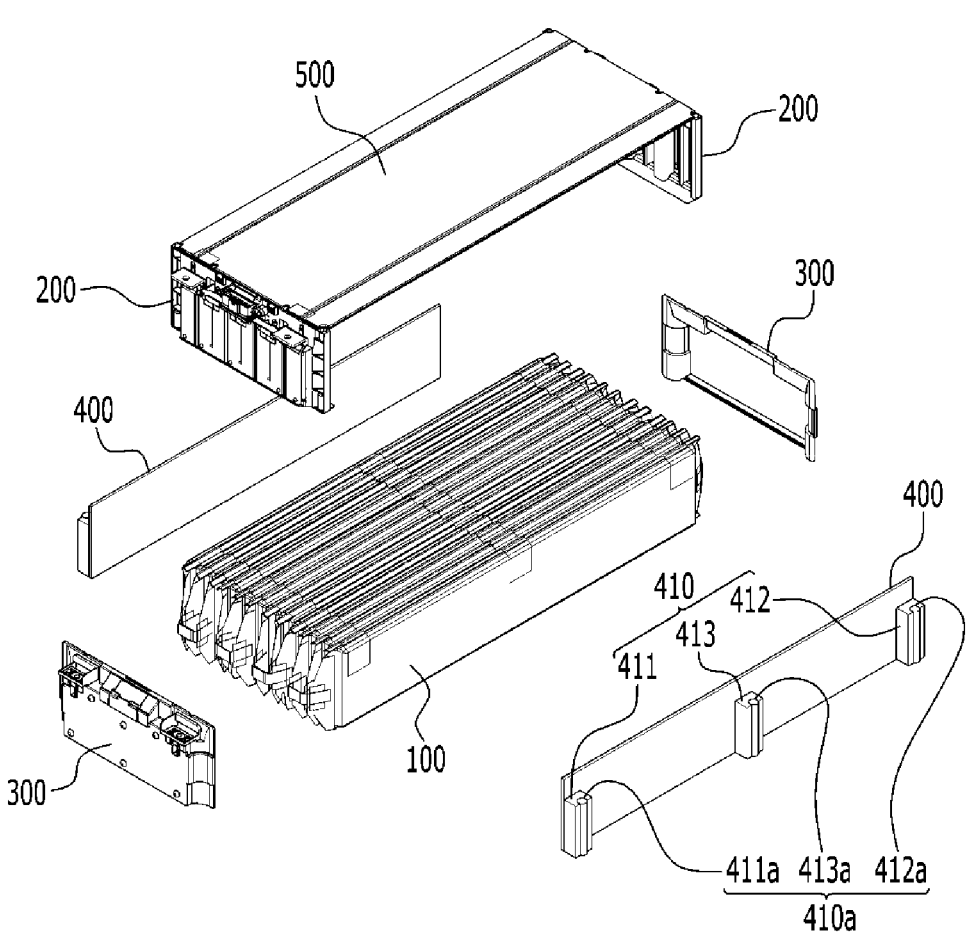
FIG. 5 is an exploded perspective view illustrating the battery module having an upper plate according to a modified embodiment of the present disclosure.

FIG. 5 is an exploded perspective view illustrating the battery module having an upper plate according to a modified embodiment of the present disclosure.

Referring to FIG. 5, the battery module according to a modified embodiment of the present disclosure may further include an upper plate 500 located on the upper side of a sensing member and covering an upper surface of a battery cell 100 stack and a sensing member.

The upper plate 500 according to the modified embodiment of the present disclosure may be formed of plastic that is lighter than a metal and may be also formed of a film that is lighter than plastic. Accordingly, the weight of the battery module may become light as compared with the upper side structure of the frame according to the related art, which is formed of a metal, to also protect electric components of the battery module on the upper side of the battery cell stack through the upper plate 500.

The contents except for the above-mentioned contents are the same as those described for the battery module and the battery pack according to one embodiment of the present disclosure.

Hereinafter, according to a modified embodiment of the present disclosure, a battery module having a lower cover will be described.

Figure 6:
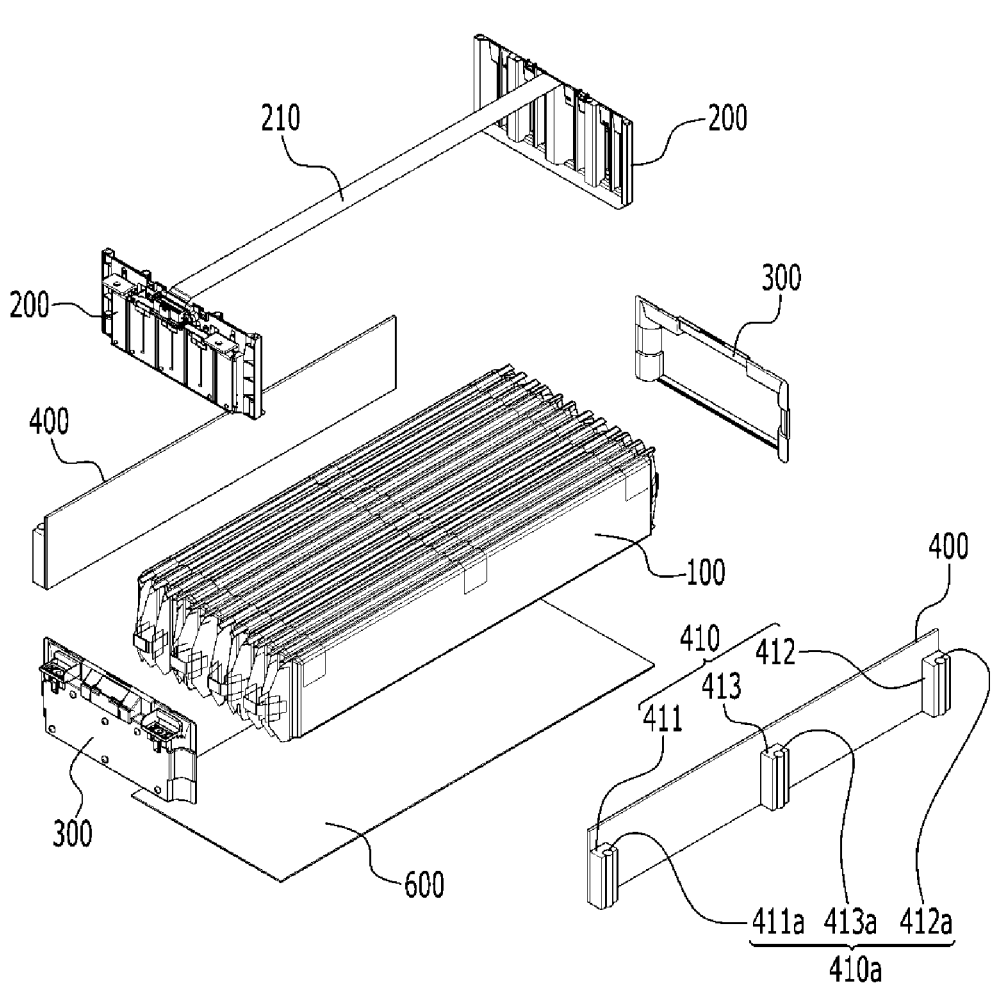
FIG. 6 is an exploded perspective view illustrating the battery module having a lower cover according to a modified embodiment of the present disclosure.

FIG. 6 is an exploded perspective view illustrating the battery module having the lower cover according to the modified embodiment of the present disclosure.

Referring to FIG. 6, the battery module according to the modified embodiment may further include a lower cover 600 covering the lower surface of the battery cell 100 stack. According to a modified embodiment of the present disclosure, the lower cover 600 may be formed of a film that is lighter than a metal. Accordingly, the weight of the battery module may become light as compared with the upper side structure of the frame according to the related art, which is formed of a metal to prevent in advance an unexpected damage that may be caused on the lower surface of the battery cell stack when the battery module is assembled to the battery pack through the lower cover 600.

The contents except for the above-mentioned contents are the same as those described for the battery module and the battery pack according to one embodiment of the present disclosure.

The above-mentioned battery module may be included in the battery pack. The battery pack may be a structure, to which a battery management system (BMS) that collectively manages the temperatures, the voltages, or the like of the batteries of one or more battery modules according to the present disclosure and a cooling device are added, such that the BMS and the cooling device are packed. A plurality of battery modules may be installed in the battery pack, and lower surfaces of the battery cell stacks formed in the plurality of battery modules contact a thermally conductive layer formed in the battery pack, so that heat generated in the battery cell can be emitted to the outside through a heat sink formed to contact the thermally conductive layer.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell
200: busbar frame
210: sensing member
300: insulation plate
400: side surface plate
410: mounting part
411, 412, 413: first, second, third mounting part
411a, 412a, 413a: first, second, third coupling hole
500: upper plate
600: lower cover
700: thermally conductive layer
800: heat sink

The invention claimed is:
1. A battery pack, comprising:
a battery cell stack in which a plurality of battery cells are stacked;
a busbar frame covering at least a portion of at least one surface of the battery cell stack;
a sensing member connected to the busbar frame; and
side surface plates covering at least a portion of respective side surfaces of the battery cell stack,
wherein each of the side surface plates includes a mounting part formed on an outer surface thereof,
wherein an entirety of a lower surface of the battery cell stack is opened such that the lower surface is not covered by a frame of the battery pack, and
wherein outermost battery cells of the plurality of battery cells and the side surface plates are coupled to each other, respectively.
2. The battery pack of claim 1, further comprising an insulation plate covering at least a portion of the busbar frame.

3. The battery pack of claim 2, wherein the insulation plate is coupled with the busbar frame or at least one of the side surface plates to fix the plurality of battery cells forming the battery cell stack.
4. The battery pack of claim 2, wherein the insulation plate is formed of a plastic.
5. The battery pack of claim 2, further comprising a thermally conductive layer contacting the lower surface of the battery cell stack on a lower side of the battery pack, and a heat sink located on a lower side of the thermally conductive layer, wherein each of the plurality of battery cells is in contact with the thermally conductive layer, and wherein the insulation plate is coupled with at least one of the side surface plates to fix the plurality of battery cells forming the battery cell stack.
6. The battery pack of claim 5, wherein the insulation plate is coupled with at least one of the side surface plates through an adhesive agent.
7. The battery pack of claim 1, wherein the sensing member is connected to the busbar frame on an upper side of the battery cell stack, and an upper plate is located on an upper side of the sensing member to cover at least a portion of an upper surface of the battery cell stack and the sensing member.
8. The battery pack of claim 7, wherein the upper plate is formed of a plastic or a film.
9. The battery pack of claim 1, wherein each of the side surface plates is formed of a metal.
10. The battery pack of claim 1, wherein the battery cell stack and the side surface plates are coupled to each other by an adhesive agent.
11. The battery pack of claim 1, wherein in at least one of the side surface plates, the mounting part is formed of first, second, and third mounting parts and a coupling hole is formed upwards and downwards through each of the first, second, and third mounting parts.
12. The battery pack of claim 1, further comprising:
a thermally conductive layer contacting the lower surface of the battery cell stack on a lower side of the battery pack; and
a heat sink located on a lower side of the thermally conductive layer.
13. The battery pack of claim 12, wherein the heat sink includes refrigerant flowing therethrough.
14. A battery pack, comprising:
a battery cell stack in which a plurality of battery cells are stacked;
a busbar frame covering at least a portion of at least one surface of the battery cell stack;
an insulation plate covering at least a portion of the busbar frame;
a sensing member connected to the busbar frame; and
side surface plates covering at least a portion of respective side surfaces of the battery cell stack,
wherein each of the side surface plates includes a mounting part formed on an outer surface thereof,
wherein an entirety of a lower surface of the battery cell stack is opened such that the lower surface is not covered by a frame of the battery pack,
wherein outermost battery cells of the plurality of battery cells and the side surface plates are coupled to each other, respectively, and
wherein the insulation plate is coupled with the busbar frame to fix the plurality of battery cells forming the battery cell stack.

15. The battery pack of claim 14, wherein the insulation plate is coupled with the busbar frame through an adhesive agent.

16. A battery pack, comprising:

a battery cell stack in which a plurality of battery cells are stacked;

a busbar frame covering at least a portion of at least one surface of the battery cell stack;

an insulation plate covering at least a portion of the busbar frame;

a sensing member connected to the busbar frame; and side surface plates covering at least a portion of respective side surfaces of the battery cell stack, wherein each of the side surface plates includes a mounting part formed on an outer surface thereof, wherein an entirety of a lower surface of the battery cell stack is opened such that the lower surface is not covered by a frame of the battery pack, wherein outermost battery cells of the plurality of battery cells and the side surface plates are coupled to each other, respectively, and wherein the insulation plate is coupled with at least one of the side surface plates to fix the plurality of battery cells forming the battery cell stack.

17. The battery pack of claim 16, wherein the insulation plate is coupled with at least one of the side surface plates through an adhesive agent.

* * * * *